United States Patent Office 3,374,098
Patented Mar. 19, 1968

3,374,098
FLAKE SALT MADE FREE-FLOWING BY APPLYING PROPYLENE GLYCOL TO THE SALT PARTICLE SURFACES
John F. Heiss, St. Clair, and Glen E. Binsley, Marysville, Mich., assignors to Diamond Crystal Salt Co., St. Clair, Mich., a corporation of Michigan
No Drawing. Filed Nov. 29, 1965, Ser. No. 510,365
4 Claims. (Cl. 99—143)

ABSTRACT OF THE DISCLOSURE

A free flowing non-caking, fine flake salt composition containing propylene glycol in an amount of about 0.005% to less than 0.05% by weight of the composition to produce a non-caking salt. This salt composition disperses, mixes and dissolves readily to improve the flavor and eating qualities of a wide range of food products.

---

This invention relates to an improved salt composition which is free-flowing and noncaking.

In the past, caking of salt products has long been a problem to those who package, manufacture, store or sell salt. As is well known, it is desirable that a salt product should be noncaking and free-flowing as this greatly facilitates the use, handling and storage of the salt. The caking of salt is caused by moisture between the crystals of the salt which moisture partially dissolves minute quantities of the sodium chloride to form a salt solution. As the salt redries the salt solution bridges the salt particles at their points of contact, evaporates, and then leaves crystallized sodium chloride causing a structural connection between the salt particles, or in other words, caking of the salt particles and an inhibiting of the free-flowing characteristics of the salt. For example fine flake salt is subject to severe caking during storage periods, and when the flake salt is placed under pressure in bags that are palletized or stacked one on top of another, the caking is especially severe. If such hot flake salt from its production process is cooled before packaging, the tendency to cake is lessened, however, cooling of the salt before packaging requires expensive extra equipment and does not guarantee caking resistance. Therefore, an anticaking agent is required, and in view of the above there has been a heretofore unfilled need for an effective and economical anticaking agent which can be added to flake salt as well as other particulated salt products while still in a hot condition, to thereby allow the bagging of the product immediately thereafter without drying or cooling and without experiencing caking of the bagged salt over relatively long storage periods under pressure from palletizing, variable moisture conditions, etc. Also, the anticaking agent when used with salt should provide an improved salt composition having a capability for absorption to a certain extent of the included moisture in the salt crystals, which moisture comes to the surface of the crystals during drying and long storage. The use of various prior art anticaking agents has been attempted with salt, such as for example, glycerine (U.S. Patent 2,056,540), sorbitol (U.S. Patent 2,183,173), and the like. However, none of these have proved completely satisfactory for one reason or another.

One object of this invention is therefore to provide an improved salt composition which is free-flowing and non-caking.

Another object of the invention is to provide an improved process for treating salt to render it free-flowing and noncaking.

Another more specific object of the invention is to provide an improved salt composition containing an additive of propylene glycol which inhibits the caking of the salt and renders the salt free-flowing.

Other objects, features and advantages of the present invention will become apparent from the subsequent description and the appended claims.

Broadly stated, from a composition aspect the present invention comprises a salt composition having improved free-flowing and noncaking characteristics due to the addition thereto of propylene glycol. In its process aspect, the present invention resides in the discovery that salt can be endowed with unusually good and unexpected free-flowing and noncaking characteristics by applying to the surface of the salt an additive comprised of propylene glycol.

The improved salt compositions of this invention which contain the propylene glycol additive are not limited to the flake salts but also include the evaporated salts such as grainer, Dendritic and vacuum pan; as well as rock, solar, compacted flake and pulverized salts.

The benefits of the invention reside in the discovery that, first, only a low level of propylene glycol, that is, less than 0.05% by weight on an anhydrous basis is required in the salt composition to provide very effective, unexpected, free-flowing and noncaking characteristics. Therefore, the invention provides an economic advantage from the standpoint that the characteristics can be bestowed on the salt by utilizing a relatively small amount of the additive. Second, using the propylene glycol anticaking agent disclosed in this invention, salt products can be packaged while still in a hot condition thereby eliminating the need for additional drying or cooling equipment. Third, the improved salt composition of this invention which contains propylene glycol as an anticaking agent has the ability to absorb included moisture in the salt crystals, which moisture comes to the surface of the crystals during storage periods.

Although it is not intended to limit or restrict the scope of the invention by reliance on a particular theory of operation, it is believed that the unexpected effectiveness and superiority with respect to free-flowing and non-caking characteristics of the propylene glycol and salt composition is due to the surface tension and viscosity properties of the propylene glycol additive. For example, it has been determined that the salt composition of this invention containing propylene glycol as an anticaking agent is markedly superior to salt compositions containing glycerine as an anticaking agent. In addition, the prior art, U.S. Patent 2,744,823, would lead one to believe that propylene glycol acts as a non-free-flowing agent when added to salt. In direct contradiction to this teaching, the unexpected discovery has been made in this invention that when propylene glycol is added to salt at levels below 0.05% by weight, the propylene glycol acts in a very superior manner as both a free-flowing and anticaking agent.

Sorbitol solutions have also been used as anticaking and dust control agents in salt for many years. However, a primary disadvantage of sorbitol is that under low humidity storage conditions, the sorbitol solution crystallizes out, becoming ineffective as an anticaking agent. Such crystallization does not occur with the salt compositions containing propylene glycol as anticaking agent; and also, sorbitol does not have the favorable humectant properties of propylene glycol which remains liquid even at relatively low humidities. A test was conducted to show the improved performances of propylene glycol compared with sorbitol. Nine hundred grams of Alberger fine flake salt was added to each of four two-liter wide mouth glass vessels. Then 0.067% by weight water was added to the salt in vessel No. 1, and 0.033% water to the salt in vessel No. 2. A commercial grade of propylene glycol was then diluted with water in the proportions of 1:1 by volume, and this solution was added to the salt in vessel No. 3 in an amount which gave 0.035% by weight anhydrous propylene glycol in the salt. The sorbitol solution was made up by diluting 1 volume of a 70% by weight aqueous solution of sorbitol with 1 volume of water. This 1:1 volume solution of sorbitol was added to the salt in vessel No. 4 so that there was 0.043% by weight of the sorbitol 70% solution in the vessel. Each of the four salt containing vessels contained at least 0.033% by weight water as a control level of moisture. The salt in each vessel was blended thoroughly so that the added moisture in anticaking additives would be thoroughly distributed. The four salt samples were air dried at room temperature over night and observations were made as follows. The Alberger fine flake salt containing sorbitol was observed to exhibit more caking than the vessel No. 2 flake salt containing 0.033% by weight water. The propylene glycol-flake salt gave least caking and best results, considerably better than the sorbitol sample, even at the low treatment level of 0.035% by weight propylene glycol. The test also demonstrated that the sorbitol dried out as rapidly as the control samples and was ineffective thereafter.

The broad composition limits for the propylene glycol additive in the salt composition of this invention, expressed on an anhydrous basis, should be such that the propylene glycol is less than 0.05% by weight of the total salt composition, with the lower limit being about 0.005% by weight. Best results have been obtained, however, when the amount of propylene glycol in the salt composition is maintained within a preferred range between about 0.025% and about 0.045% by weight.

The use of relatively small amounts of propylene glycol additive in the salt composition of this invention is most advantageous for bagged salt products, especially if the salt is to be preserved in a dry free-flowing condition. However, the propylene glycol additive also can be used for bulk treatment of salt, and at critical humidities below 75% the salt will be relatively dry and free-flowing because of the very low concentration of the propylene glycol additive. As previously referred to the salt compositions of this invention containing propylene glycol as an anticaking agent include evaporated salts such as grainer, Dendritic, vacuum pan or Alberger, and also, rock, solar, compacted flake and pulverized salts. However, it has been determined that the propylene glycol additive gives best results when used with flake salts and for this reason the preferred composition of this invention is a flake salt containing propylene glycol to render the flake salt free-flowing and noncaking. As used herein the term flake salt means a salt having an apparent density in the range between about 700 and about 1000 grams per 1000 per cubic centimeters. By the term apparent density it is meant that density which is measured by filling a 1000 cubic centimeter vessel with the salt without compacting, then leveling off the salt and measuring the weight of the vessel to determine the grams of salt per 1000 cubic centimeters. Also, in the preferred composition of this invention, the flake salt used therein contains less than 1/10 of 1% by weight moisture when said salt is received from its preparation process prior to the addition of propylene glycol. Since the flake salt referred to in the preferred composition has a very low moisture content prior to treatment, only a relatively small amount of propylene glycol is required to endow the composition with the desired characteristics, and the salt composition obtained after treating the salt with propylene glycol is subsequently dry, noncaking and free-flowing, and not moist or sticky. As used herein, the term moisture content means loss in weight of the salt after approximately 24 hours exposure in a drying oven at 105° C. This loss in weight based on 100 grams of salt equals the percent water present as described in "Sodium Chloride" by Kaufmann, ACS monograph, series No. 145, page 333 et seq., published by Reinhold in 1960.

In order to further illustrate the invention, the following examples are provided. It is to be understood, however, that the examples are included for illustrative purposes and are not intended to be limiting of the scope of the invention as set forth in the subjoined claims.

*Example 1*

A 1000 gram sample of fine flake salt taken from production was blended with an additive of USP grade propylene glycol. The amount of additive used was 0.35 milliliter.

*Example 2*

A 90% propylene glycol-10% water by volume solution was added to a 1000 gram sample of fine flake salt in the same amount as in Example 1.

*Example 3*

An 80% propylene glycol-20% water by volume solution was added to a 1000 gram sample of flake salt in the same amount as in Example 1.

*Example 4*

A 60% propylene glycol-40% water by volume solution was added to a 1000 gram sample of flake salt in the same amount as in Example 1.

*Example 5*

A 40% propylene glycol-60% water by volume solution was added to a 1000 gram sample of flake salt in the same amount as in Example 1.

Evaluation tests were conducted with fine flake salt blends to determine the effectiveness of various propylene glycol solutions in comparison with glycerine solutions as an anticaking agent. For the tests, 1000 gram samples of fine flake salt taken from production were blended with the additives shown infra in Table 1, except for Sample 1, which was plain fine flake salt without any additive; 0.35 milliliter of additive was used with each 1000 gram sample of salt. Four hundred milliliter tall form beakers were filled with salt after preparation and placed on top of an oven where they were subjected to mild drying conditions for a period of six days. The beakers were then inverted over a U.S. 12 mesh test screen with salt retained on same being weighed as an indication of the amount of caking taking place. The results are expressed in Table 1 as percent retained beside the description of the additive used with each salt sample.

TABLE 1

| Sample No. | Additive Composition | Weight Percent Retained on Screen |
|---|---|---|
| 1 | Plain fine flake (nothing added) | 97.0 |
| 2 | Propylene glycol (USP) | 0.7 |
| 3 | Propylene glycol 90%-water 10% by volume | 0.3 |
| 4 | Propylene glycol 80%-water 20% by volume | 1.1 |
| 5 | Propylene glycol 60%-water 40% by volume | 9.9 |
| 6 | Propylene glycol 40%-water 60% by volume | 35.6 |
| 7 | Glycerine (USP) | 93.8 |
| 8 | Glycerine 80%-water 20% by volume | 91.3 |
| 9 | Glycerine 60%-water 40% by volume | 93.5 |
| 10 | Glycerine 40%-water 60% by volume | 95.0 |

The conclusions from the test data shown in Table 1 are that, compared with glycerine, propylene glycol is a superior anticaking additive and the same holds true for comparisons of aqueous solutions of either of the two when using aqueous solutions of equal volume percentages.

As used herein, the term propylene glycol means a free-flowing or anticaking agent, which is present in the improved salt composition of the invention, and it is to be understood that the propylene glycol referred to is not necessarily anhydrous in that variable amounts of water may be present in the propylene glycol. In this respect it has been determined that satisfactory results are obtained in the invention as long as the water content of the propylene glycol is kept below about 50% by volume, however, it is preferred that the water content in the propylene glycol be lower than 20% by volume, and most suitable results are obtained with commercially available propylene glycol or laboratory grade propylene glycol containing at most only a few percent by volume water.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A free-flowing salt composition in particulated form comprised of particulated flake salt having an apparent density between about 700 and about 1000 grams per 1000 cubic centimeters having on at least a portion of the surfaces of the particles thereof an additive of propylene glycol in an amount from about 0.005% to less than 0.05% by weight of said composition.

2. The composition as defined in claim 1 wherein said propylene glycol is present in an amount between about 0.025% and about .045% by weight of said composition.

3. The method of treating a particulated flake salt composition having an apparent density between about 700 and about 1000 grams per 1000 cubic centimeters to inhibit the caking tendency thereof and render the salt free-flowing comprising the step of applying to at least a portion of the surfaces of the salt particles an additive of propylene glycol in an amount from about 0.005% to less than 0.05% by weight of said composition.

4. The method as defined in claim 3 wherein the propylene glycol is present in an amount between about 0.025% and about 0.045%.

References Cited

UNITED STATES PATENTS

| | | | |
|---|---|---|---|
| 2,056,640 | 10/1936 | Segura | 99—143 |
| 2,183,173 | 12/1939 | Segura | 99—143 |
| 2,511,804 | 6/1950 | Hall | 99—143 X |
| 2,668,770 | 2/1954 | Hall | 99—159 X |
| 2,668,771 | 2/1954 | Hall | 99—159 X |
| 2,744,823 | 5/1956 | Diamond | 99—2 |
| 3,095,306 | 6/1963 | Peat | 99—143 X |
| 3,269,845 | 8/1966 | Pomeroy | 99—143 |

A. LOUIS MONACELL, *Primary Examiner.*

JOSEPH M. GOLIAN, *Examiner.*

D. M. NAFF, *Assistant Examiner.*